United States Patent [19]

Seidel et al.

[11] Patent Number: 4,617,958

[45] Date of Patent: Oct. 21, 1986

[54] CONTROL VALVE

[75] Inventors: William E. Seidel, Rockford; Albert L. Markunas, Roscoe; Thomas A. Nelson, Rockford, all of Ill.

[73] Assignee: Sundstrand Corporation, Rockford, Ill.

[21] Appl. No.: 758,760

[22] Filed: Jul. 25, 1985

[51] Int. Cl.[4] .......................................... G05D 16/00
[52] U.S. Cl. .................................. 137/492.5; 137/488
[58] Field of Search ...................... 137/488, 492, 492.5, 137/489, 495

[56] References Cited

U.S. PATENT DOCUMENTS

| 1,843,953 | 2/1932 | McKinney ...................... 137/488 X |
|---|---|---|
| 2,158,068 | 5/1939 | Grove . |
| 2,196,279 | 4/1940 | Thomas . |
| 2,399,938 | 5/1946 | Pett . |
| 2,737,197 | 3/1956 | Jaseph . |
| 2,858,700 | 11/1958 | Rose . |
| 3,007,514 | 11/1961 | Werts . |
| 3,055,389 | 9/1962 | Brunner . |
| 3,097,664 | 7/1963 | Henley . |
| 3,354,901 | 11/1967 | Dietiker et al. . |
| 3,357,443 | 12/1967 | Brumm . |
| 3,433,251 | 3/1969 | Avant ................................. 137/488 |
| 3,498,183 | 3/1970 | Risk . |
| 3,525,355 | 8/1970 | Katchka . |
| 3,706,320 | 12/1972 | Kalsi . |
| 3,769,998 | 11/1973 | Avant . |
| 4,421,473 | 12/1983 | Londerville . |

Primary Examiner—Alan Cohan
Attorney, Agent, or Firm—Wood, Dalton, Phillips, Mason & Rowe

[57] ABSTRACT

To provide pressure regulation, limit pressure rise rate and control the speed of a fluid operated system with a control valve, a pilot operated valve member is in communication with a fluid passageway on both the inlet and outlet sides of a butterfly valve. The pilot operated valve member is also in communication with an actuator operable to move the butterfly valve between a closed position and an open position dependent upon fluid pressure on the inlet side and outlet side of the butterfly valve. By utilizing fluid pressure signals delivered to three separate chambers, the pilot operated valve member is capable of controlling valve opening ramp rate, pressure variations within the limit of a set point, and adjustability of the set point.

20 Claims, 3 Drawing Figures

CONTROL VALVE

FIELD OF THE INVENTION

This invention relates to a control valve, and more specifically, to a control valve for supplying a fluid under pressure to a fluid operated system.

BACKGROUND OF THE INVENTION

Control valves for a variety of applications have been known for many years. One application is that of pressure regulation wherein it is desirable to control the pressure supplied to a pressure driven device such as an air turbine starter. Most frequently, this is accomplished by means of inlet and outlet pilot signals being directed to a pilot operated valve.

In a common application, the control valve controls the pressure of fluid initially supplied to the air turbine starter to prevent destructive shock from being imparted to the mechanism. As the starter responds, the rate of increase in fluid pressure is typically progressive to effect a smooth, rapid acceleration of the mechanism. In addition, the control valve serves to maintain fluid pressure by responding to fluid pressure sensed on the upstream side of the air turbine starter.

In making a control valve of this type, a problem is to provide combined means for regulating pressure, limiting pressure rise rate, and controlling the speed of the air turbine starter. It is also difficult to meet strict speed requirements over a wide range of load transients. Moreover, control valves usually do not provide high frequency response because of the difficulty in controlling valve dynamics and nonlinearities such as friction and aerodynamic forces.

While overcoming problems of this type, it is also desirable to control the rate of increase in fluid pressure by ramping the fluid pressure set point at a required rate up to a selected maximum. It is also desirable to eliminate the complexity and problems associated with valve systems of this type in sensing pressure derivatives pneumomechanically. Further, it is desirable to eliminate supply pressure sensitivity problems associated with limiting the valve opening rate in conventional control valves.

The present invention is directed to overcoming the above stated problems and accomplishing the stated objects.

SUMMARY OF THE INVENTION

It is the principal object of the present invention to provide a new and improved control valve for supplying a fluid under pressure to a fluid operated system. More specifically, it is an object of the invention to provide a control valve which provides pressure regulation, limits pressure rise rate, and controls the speed of a pressure driven mechanism such as an air turbine starter. It is likewise an object of the invention to provide a control valve capable of meeting strict speed requirements over a wide range of load transients with high frequency response.

An exemplary embodiment of the invention achieves the foregoing objects in a control valve having a fluid passageway including an inlet communicating with a source of fluid and an outlet communicating with a fluid operated system. A valve member is disposed in the fluid passageway between the inlet and outlet and is movable between a closed position prior to start-up of the system and open and closed positions thereafter. Additionally, the control valve includes pilot operated valve means responsive to fluid pressure on the inlet and outlet sides of the valve member and an actuator communicates with the fluid passageway on the inlet side of the valve member through the pilot operated valve means.

In the exemplary embodiment, the actuator is operable to move the valve member between the closed and opened positions dependent upon the fluid pressure on the inlet and outlet sides of the valve member. This is accomplished through the pilot operated valve means which includes means for limiting the rate of increase in fluid pressure toward an operating pressure on the outlet side of the valve member during start-up of the system, means for adjusting the pressure on the outlet side of the valve member to change the speed of the system during operation thereof, and means for limiting the fluid pressure on the outlet side of the valve member to the operating pressure during operation of the system. More specifically, the pilot operated valve means preferably operates such that the means for limiting the rate of increase in fluid pressure is inactive during operation of the means for adjusting the pressure to change the speed of the system.

In a preferred embodiment, the pilot operated valve means includes a valve body having a cavity with a first port at one end generally concentric with and axially spaced from a second port at the other end. It also includes an axially movable control poppet in the cavity extending between the first and second ports and having a first end for lapped sealing engagement with the first port and a second end for lapped sealing engagement with the second port. Moreover, the control poppet is axially positionable in the cavity in a nearly zero lapped position relative to the first and second ports and is biased toward the second port by the fluid pressure on the inlet side of the valve member.

With this construction, the pilot operated valve means includes means for biasing the control poppet in a direction opposite the direction of biasing of the fluid pressure on the inlet side of the valve member. The cavity also includes a third port in communication with the actuator and disposed such that, in the nearly zero lapped position, the poppet accommodates flow of the fluid from the first port, through the cavity, and through at least the third port to the actuator and, preferably, partially through the second port to a vent, as well, in order to accurately control the pressure supplied to the actuator. In order to control the pressure under which the poppet will be in the nearly zero lapped position, the biasing means is adjustable which makes it possible to vary the pressure supplied to the actuator.

To prevent damage to the fluid pressure driven mechanism, the biasing means limits the fluid pressure on the outlet side of the valve to a predetermined set operating pressure.

To provide for convenient adjustability and easy assembly, the pilot operated valve means is constructed in a modular fashion.

To initiate operation of the control valve, a separate on-off valve and a pressure regulator valve are provided on the inlet side of the pilot operated valve means.

Other objects and advantages will become apparent from the following specification taken in connection with the accompanying drawings.

DESCRIPTION OF THE PREFERRED EMBODIMENT

Figure 1:
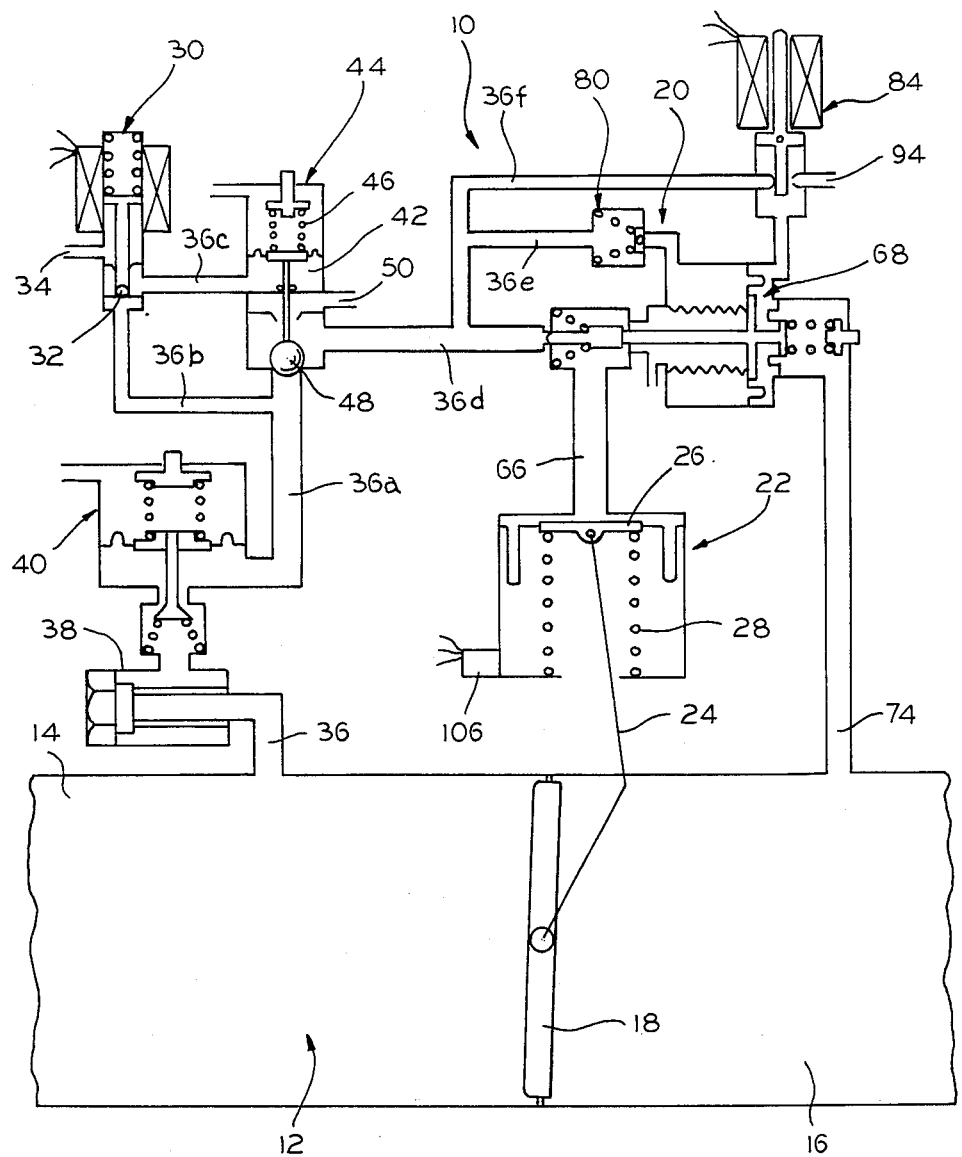
FIG. 1 is a schematic view of a control valve according to the invention.

An exemplary embodiment of a control valve for supplying a fluid under pressure to a fluid operated system such as an air turbine starter in accordance with the invention is illustrated in FIG. 1. The control valve 10 includes a fluid passageway 12 having an inlet 14 communicating with a source of fluid and an outlet 16 communicating with the fluid operated system (not shown). In addition, the control valve 10 includes valve means such as butterfly valve 18 disposed in the fluid passageway 12 between the inlet 14 and outlet 16.

With the arrangement illustrated in FIG. 1, the butterfly valve 18 is movable between a closed position (as illustrated) prior to start-up and open and closed positions during operation of the fluid operated system. The control valve 10 also includes a pilot operated valve member 20 responsive to fluid pressure on the inlet and outlet sides 14 and 16, respectively, of the butterfly valve 18. In addition, the control valve 10 includes actuator means such as the spring biased piston actuator 22 adapted for controlled communication with the fluid passageway 12 on the inlet side 14 of the butterfly valve 18 through the pilot operated valve member 20.

More particularly, the actuator 22 is operable to move the butterfly valve 18 between the closed and open positions. This can be accomplished, for instance, by means of a link 24 extending from the actuator 22 to the butterfly valve 18 whereby reciprocal movement of the piston 26 downward against resistance of the spring 28 and upward by means of the biasing force of the spring 28 is translated into opening and closing movement of the butterfly valve 18 within the fluid passageway 12. In this connection, the actuator 22 moves the butterfly valve 18 dependent upon the fluid pressure on the inlet and outlet sides 14 and 16 of the butterfly valve 18.

During start-up, an on-off solenoid 30 is energized to move a ball valve 32 from the closed position illustrated to an open position closing the vent 34 after which fluid flows from an inlet line 36 through a filter 38 and is regulated by a pressure regulator-relief valve 40. This fluid flow then flows through intermediate lines 36a, 36b and 36c to pressurize a diaphragm chamber 42 of an on-off valve 44 which overcomes a spring 46 to cause a ball valve 48 to move from the closed position illustrated to an open position closing a vent 50. At this point, fluid flows through the intermediate lines 36a and 36d to supply fluid pressure from the inlet line 36 to the pilot operated valve member 20.

Figure 2:
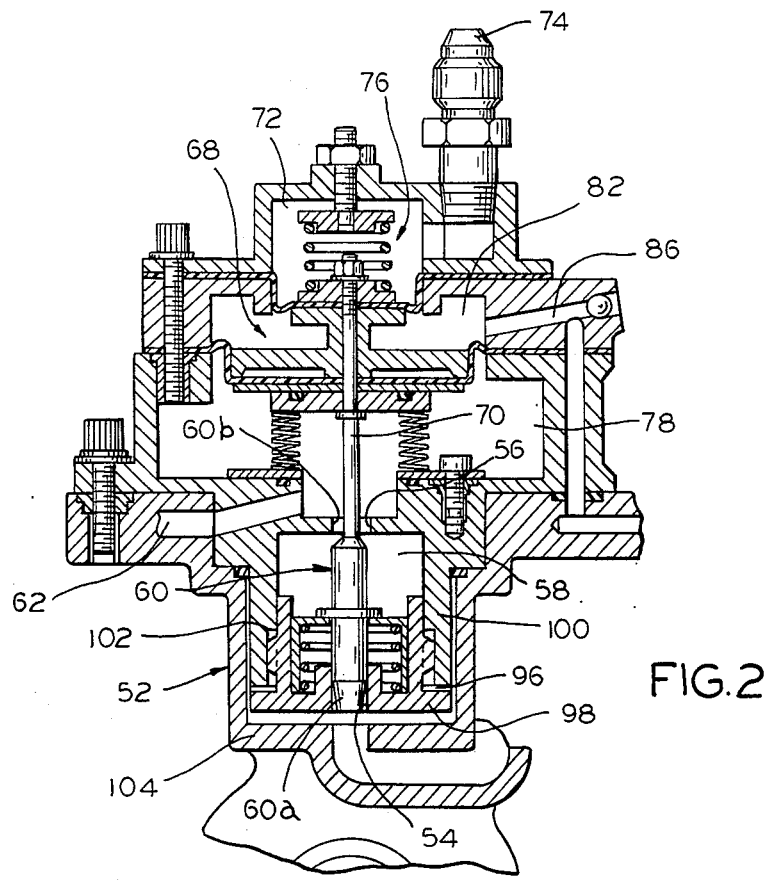
FIG. 2 is a sectional view of a pilot operated valve member utilized in the control valve of FIG. 1.
Figure 3:
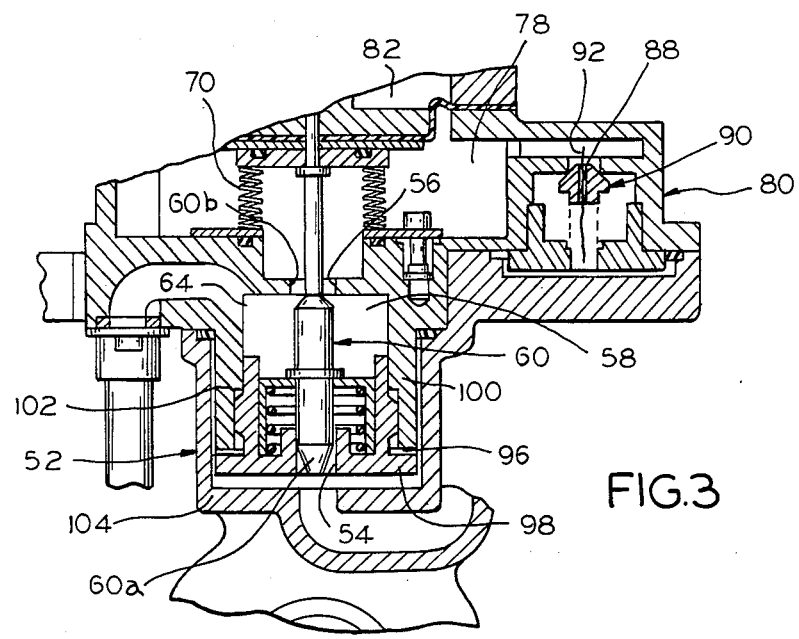
FIG. 3 is a sectional view of the pilot operated valve member of FIG. 2 illustrating integral control means.

Referring now to FIGS. 2 and 3, the details of construction of the pilot operated valve member 20 can be understood in greater detail. It includes a valve body 52 with a first port 54 generally concentric with and axially spaced from a second port 56 at opposite ends of a cavity 58. With this arrangement, the first port 54 is adapted to be subjected to fluid under pressure from the inlet line 36 for biasing a control poppet 60 in the cavity 58 toward the second port 56.

As shown in FIGS. 2 and 3, the poppet 60 extends between and is axially movable relative to the first and second ports 54 and 56, respectively. It will be seen that the poppet 60 has a first end 60a for lapped sealing engagement with the first port 54 and a second end 60b for lapped sealing engagement with the second port 56. During operation, the poppet 60 is axially positionable in the cavity 58 in a nearly zero lapped position, i.e., not sealed, relative to the first and second ports 54 and 56, respectively.

As will be appreciated, the poppet 60 is an elongated cylindrical valve member generally concentric with the first and second ports 54 and 56, respectively. The substantially uniform diameter of the poppet 60 closely approximates the diameter of the first and second ports 54 and 56, respectively, so that the opposing ends 60a and 60b are adapted for sliding insertion into the first and second ports and the generally conically tapered surfaces of the opposing ends 60a and 60b are positionable relative to the first and second ports so as to control the gain characteristics of the pilot operated valve member 20 during operation thereof. With this arrangement, the poppet 60 accommodates flow of a portion of the fluid from the first port 54, through the cavity 58, and through the second port 56 in the nearly zero lapped position thereof.

Referring to FIG. 2 in particular, the second port 56 is in communication with a vent 62 adapted to receive fluid from the inlet line 36 under selected conditions. The pilot operated valve member 20 also includes a third port 64 (see FIG. 3) in communication with the cavity 58 which uses the fluid from the inlet line 36 at selected pressures by supplying it to the actuator 22. In other words, when the poppet 60 is in a nearly zero lapped position, part of the fluid from the inlet line 36 passes through the vent 62 and part of the fluid from the inlet line 36 passes through the third port 64 to the actuator 22 through the line 66 (see FIG. 1).

Referring once again to FIG. 2, the pilot operated valve member 20 includes means in the body for biasing the poppet 60 in a direction opposite the direction of biasing of the fluid under pressure from the inlet line 36. The biasing means preferably includes a displaceable diaphragm assembly 68 spaced from and operatively joined to the poppet 60 by means of an axially extending rod 70 that contacts the end 60b of the poppet 60. When the diaphragm assembly 68 is displaced, the poppet 60 moves in response to such displacement.

The diaphragm assembly 68 defines a first chamber 72 in the body 52 isolated and spaced from the cavity 58 and adapted for communication with a fluid pressure signal carried by an outlet line 74 in communication with the fluid passageway 12 on the outlet side 16 of the butterfly valve 18 (see FIG. 1). This fluid pressure signal controls the position of the poppet 60 relative to the first and second ports 54 and 56, respectively, through the diaphragm assembly 68. In particular, the fluid pressure signal from the outlet line 74 biases the diaphragm assembly 68 in a direction opposite the direction of biasing of the fluid under pressure from the inlet line 36 on the poppet 60. Moreover, separate adjustment means is provided in the chamber 72 in the form of an adjustable spring assembly 76 for biasing the diaphragm assembly 68 in the same direction as the direction of biasing of the fluid pressure signal from the outlet line 74.

As further shown in FIG. 2, the pilot operated valve member 20 includes a second chamber 78 defined in part by the diaphragm assembly 68. The second chamber 78 is isolated and spaced from the cavity 58 and the first chamber 72 and is adapted for communication with a second fluid pressure signal comprising a part of the fluid under pressure from the inlet line 36 passing through an intermediate line 36e and a ramp control valve 80 (see FIGS. 1 and 3) to act on the other side of the diaphragm assembly 68, i.e., on the side opposite the fluid pressure signal from the outlet line 74 supplied to the chamber 72. As will be appreciated, the second fluid pressure signal causes the diaphragm assembly 68 to be displaced in a direction opposite the direction of the fluid pressure signal from the outlet line 74.

Preferably, a third chamber 82 is also provided in the body 52 between the first and second chambers 72 and 78, respectively. The third chamber 82 is defined in part by the diaphragm assembly 68 and is adapted for communication with a third fluid pressure signal from a torque motor-flapper valve 84 (see FIG. 1) provided by a part of the fluid from the inlet line 36 through an intermediate line 36f and acting on the diaphragm assembly 68 in the same direction as the fluid pressure signal from the outlet line 74 in the chamber 72. As shown, the third fluid pressure signal is supplied to the chamber 82 through a line 86 extending through the body 52.

As shown in FIGS. 2 and 3, the chamber 72, 78, and 82 are isolated from one another and the cavity 58. This allows the first, second and third fluid pressure signals in the respective chambers 72, 78, and 82 to act independently on the diaphragm assembly 68 to thereby control the position of the poppet 60 relative to the first and second ports 54 and 56, respectively. As a result, the pilot operated valve member 20 provides unique control features for the control valve 10 as will be described in detail hereinafter.

As shown in FIG. 3, the control valve 80 is integral with the pilot operated valve member 20. The function of the ramp control valve 80 is to provide a controlled restriction to the second chamber 78 such that an orifice 88 in a spring biased poppet 90 in the ramp control valve will supply fluid under pressure to the second chamber 78 at a desired flow rate such that, depending upon the volume of the second chamber 78, a fixed ramp rate of fluid pressure is supplied to the actuator 22 by controlling the opening of the butterfly valve 18 operated by the actuator to provide a downstream pressure ramp rate over the operating band of the system. If desired, a wire 92 can be installed through the orifice 88 and entrapped to provide a self-cleaning feature.

For a more complete understanding of the operation of the pilot operated valve member 20, reference may be made to my copending application Ser. No. 733,050 filed concurrently herewith, the teachings of which are incorporated herein by reference.

With this understanding of the pilot operated valve member 20, the chamber 72 is pressurized by fluid from the outlet line 74 which is preferably a downstream sensing tube, i.e., a tube communicating with the fluid passageway 12 downstream or on the outlet side 16 of the butterfly valve 18. With this construction, increases in downstream pressure will cause a movement of the poppet 60 toward a closed position. As will be appreciated, such movement of the poppet 60 will result in less fluic pressure being supplied to the actuator 22 and the butterfly valve 18 controlled by the actuator will be moved toward a closed position by reason of the spring 28 biasing the piston 26 upwardly as shown in FIG. 1.

As previously discussed, the chamber 78 is sized along with the control orifice 88 to establish the required pressure ramp rate. This ramp rate exists only during increasing inlet pressure, i.e., during start-up when fluid is initially supplied to the fluid passageway 12 on the inlet side 14 of the butterfly valve 18 and, thus, into the inlet line 36, and not during the transient conditions of speed control. After the initial rise in pressure, the chamber 78 will be at a constant pressure unless inlet pressure drops.

Finally, the chamber 82 is supplied with fluid pressure through the torque motor-flapper valve 84 which receives input from a controller to control the speed of a fluid operating system such as an air starter. The effect of pressurizing and varying the pressure in the chamber 82 is to cause a change, i.e., an initial reduction and later reductions and increases in pressure, within the limit of the set point of the pilot operated valve member 22 to thereby cause desired speed effects. In a non-speed control mode, the chamber 82 will be vented to ambient through a vent 94 and the pilot operated valve member 20 will be operating at the set point, i.e., at the maximum operating pressure.

In the preferred embodiment, the pilot operated valve member 20 is of a modular construction which includes the integral ramp control valve 80, as shown in FIG. 3. The modular construction permits the spacing between the first and second ports 54 and 56, respectively, to be selectively set thereby achieving adjustment of the flow of a portion of the fluid from the first port 54, through the cavity 58, and through the second port 56 to vary the gain characteristics thereof when the poppet 60 is in a nearly zero lapped position relative to the first and second ports. In addition, the operating characteristics of the modular pilot operated valve member 20 can be varied by externally adjusting the diaphragm assembly 68 to selectively set the biasing force thereof.

Referring in particular to FIGS. 2 and 3, the means for selectively setting the spacing between the first and second ports 54 and 56, respectively, includes the use of one or more shims 96 which may be utilized in view of the fact that the modular pilot operated valve member 20 accommodates relative telescopic movement between a first body portion 98 and a second body portion 100. Within the limits of the mating shoulders as at 102 and the bottom wall 104 of the body 52, one or more shims 96 can be disposed between the first and second body portions 98 and 100, respectively, to determine the relative position of telescopic adjustment therebetween.

As will now be appreciated, the pilot operated valve member 20 includes means for limiting the rate of increase in fluid pressure toward an operating pressure on the outlet side 16 of the butterfly valve 18 during start-up of a fluid operated system such as an air turbine starter. The rate limiting means comprises the diaphragm assembly 68 including the chamber 78 in restricted communication with fluid pressure on the inlet side 14 of the butterfly valve 18 through the ramp control valve 80. The pilot operated valve member 20 also includes means for adjusting the pressure on the outlet side 16 of the butterfly valve 18 to change the speed of a fluid operated system such as an air turbine starter during operation thereof. The pressure adjusting means comprises the diaphragm assembly 68 including the chamber 82 in selective communication with fluid pressure on the inlet side 14 of the butterfly valve 18 through the separate torque motor-flapper valve 84.

The pilot operated valve member 20 further includes means for limiting fluid pressure on the outlet side 16 of the butterfly valve 18 to the operating pressure set point during operation of a fluid operated system such as an air turbine starter. The pressure limiting means comprises the diaphragm assembly 68 including the chamber 72 in communication with fluid pressure on the outlet side 16 of the butterfly valve 18. With this construction, the chamber 78 is arranged such that fluid pressure therein biases the poppet 60 toward the open position, the chamber 82 is arranged such that fluid pressure therein biases the poppet 60 toward the closed position, and the chamber 72 is arranged such that fluid pressure therein biases the poppet 60 toward the closed position.

With regard to the torque motor-flapper valve 84 utilized to control speed, it can only reduce the operating pressure set point with the maximum set point value being determined by the externally adjustable spring assembly 76. Since the torque motor-flapper valve 84 modulates the operating set point, inlet pressure sensitivity and nonlinearlity is replaced by much more desirable characteristics resulting in a speed control loop having a much more constant gain and linearity.

Under all conditions, if the on-off solenoid 30 is de-energized, the actuator 22 and control circuit for the pilot operated valve member 20 remain at ambient pressure vented through the on-off valve 44. Supply air is prevented from entering the actuator 22 by the on-off valve 44. When the on-off solenoid 30 is energized, fluid flow passes through the filter 38, the pressure regulator-relief valve 40, and ultimately to the pilot operated valve member 20 to operate the control valve 10 as described in detail hereinabove.

As previously mentioned, the fluid flow pressurizes the diaphragm chamber 42 of the on-off valve 44, which overcomes the spring 46, causing the valve ball 48 to open thereby closing the vent 50. Fluid pressure is now available to the control circuit, i.e., lines 36d, 36e and 36f and, thus, to the actuator 22 through the pilot operated valve member 20 and the line 66, although the ramp rate for opening the butterfly valve 18 is determined by the rate at which the volume of the chamber 78 is filled through the ramp control valve 80. As the pressure in the chamber 78 rises during start-up, the poppet 60 opens allowing fluid to flow through the first port 54, through the third port 64 and through the line 66 to the actuator 22 to provide for controlled opening of the butterfly valve 18 to achieve a gradual increase in pressure on the outlet side 16 at the specified rise rate.

As will be appreciated, the chamber 78 will stabilize at the regulated servo pressure after the operating pressure set point is reached. Downstream set point regulation is obtained by the build-up of regulated pressure in the chamber 72, i.e., by means of fluid pressure carried from the outlet side 16 of the butterfly valve 18, through the line 74 and into the chamber 72 and as pressure builds in the chamber 72, the poppet 60 begins to restrict the first port 54 and more fully open the second port 56 leading to the vent 62. When this occurs, the fluid pressure carried through the third port 64 to the actuator 22 is reduced until a regulated set point is reached.

If the pressure on the outlet side 16 of the butterfly valve 18 drops during transient loads on the fluid operated system, the pressure in the chamber 72 will drop. This will offset equilbrium causing the poppet 60 to move in a direction further opening the first port 54 and restricting the second port 56 which will cause additional fluid pressure to be carried through the third port 64 and the line 66 to the actuator 22 to correct the pressure drop until the operating pressure set point is reached. In inverse fashion, an increase in pressure on the outlet side 16 of the butterfly valve 18 during transient loads on the fluid operated system will cause a lower fluid pressure to be transmitted to the actuator 22 moving the butterfly valve 18 toward a closed position until the operating set point is reached.

In the maintenance mode of operation, speed control is obtained by varying the set point of the pilot operated valve member 20. This is accomplished by pressurizing the chamber 82 through the torque motor-flapper valve 84 such that an increase in pressure in the chamber 82 will in effect lower the operating pressure set point by causing the poppet 60 to restrict the first port 54 and more fully open the second port 56 leading to the vent 62 causing a drop in pressure transmitted to the actuator 22 which, in turn, causes the butterfly valve 18 to move toward a closed position thus reducing the speed of the fluid operated system. In this way, a controller for the fluid operated system can control the speed by controlling the set point through the torque motor-flapper valve 84.

In reverse fashion, the speed of the fluid operated system can again be increased by decreasing the pressure in the chamber 82 through control of the torque motor-flapper valve 84 to vent some or all of the fluid pressure in the chamber 82 through the line 86 and the vent 94. While this will in effect once again raise the operating pressure set point, the limit to which it is possible to increase the operating pressure set point in response to transient conditions is the original set point established by adjusting the externally adjustable spring assembly 76.

If a command is received to close the control valve 10, the on-off solenoid 30 is de-energized. At this time, the chamber 42 of the on-off valve 44 will rapidly approach ambient pressure due to the fact that the on-off solenoid 30 is vented through the vent 34, thus allowing the spring 46 to move the valve ball 48 to a closed position (as shown in FIG. 1) thereby preventing fluid pressure on the inlet side 12 of the butterfly valve 18 from reaching the actuator 22 through the pilot operated valve member 20. As will be appreciated, the control circuit for the pilot operated valve 20 will then bleed to ambient pressure and the ramp control valve 80 will relieve allowing for quick closure of the butterfly valve 18.

An additional feature of the present invention includes the utilization of position switches 106. The position switches 106 are operatively connected to the actuator 22 for purposes of indicating the position of the butterfly valve 18. Specifically, the position switches 106 may advantageously be utilized to actuate near the fully closed and fully opened positions.

While in the foregoing there has been set forth a preferred embodiment of the invention, it is to be understood that the invention is only to be limited by the spirit and scope of the appended claims.

I claim:

1. A control valve for supplying a fluid under pressure to a fluid operated system, comprising:

a fluid passageway including an inlet communicating with a source of said fluid and an outlet communicating with said system;

valve means disposed in said fluid passageway between said inlet and outlet, said valve means being movable between open and closed positions, said valve means being in a closed position prior to start-up of said system;

a pilot operated valve member responsive to fluid pressure on said inlet and outlet sides of said valve means; and actuator means adapted for communication with said fluid passageway on said inlet side of said valve means through said pilot operated valve member, said actuator means being operable to move said valve means between said closed position and said open position, said actuator means moving said valve means dependent upon said fluid pressure on said inlet and outlet sides of said valve means;

said pilot operated valve member including means for limiting the rate of increase in fluid pressure toward an operating pressue on said outlet side of said valve means during start-up of said system, means for adjusting said pressure on said outlet side of said valve means to change the speed of said system during operation thereof, and means for limiting said fluid pressure on said outlet side of said valve means to said operating pressure during operation of said system;

said pilot operated valve member including an axially movable poppet, said fluid pressure on said inlet side of said valve means biasing said poppet from a closed position to an open position, said pilot operated valve member also including a diaphragm assembly axially spaced from said poppet;

said diaphragm assembly including at least one chamber in communication with said fluid pressure on said outlet side of said valve means, said chamber being arranged such that said fluid pressure on said outlet side of said valve means biases said poppet toward said closed position, said diaphragm assembly and chamber comprising at least a portion of said pressure limiting means.

2. The control valve of claim 1 including an inlet pressure sensing line extending from said pilot operated valve member in communication with said fluid passageway on said inlet side of said valve means and including an outlet pressure sensing line extending from said pilot operated valve member in communication with said fluid passageway on said outlet side of said valve means.

3. The control valve of claim 2 wherein said fluid pressure on said inlet side of said valve means is supplied to said pilot operated valve member through said inlet pressure sensing line and said fluid pressure on said outlet side of said valve means is supplied to said pilot operated valve member through said outlet pressure sensing line.

4. The control valve of claim 1 including a spring assembly in said chamber acting on said diaphragm assembly to bias said poppet toward said closed position, said spring assembly being adjustable externally of said pilot operated valve member to select a predetermined set point for said operating pressure of said system.

5. The control valve of claim 1 wherein said valve means is a butterfly valve disposed in said fluid passageway and said actuator means is a spring biased piston operably joined to said butterfly valve.

6. A control valve for supplying a fluid under pressure to a fluid operated system, comprising:

a fluid passageway including an inlet communicating with a source of said fluid and an outlet communicating with said system;

valve means disposed in said fluid passageway between said inlet and outlet, said valve means being movable between open and closed positions, said valve means being in a closed position priot to start-up of said system;

a pilot operated valve member in communication with and responsive to said fluid pressure on said inlet and outlet sides of said valve member; and actuator means adapted for controlled communication with said fluid passageway on said inlet side of said valve means through said pilot operated valve member, said actuator means being operable to move said valve means between said closed position and said open position, said actuator means moving said valve member dependent upon said fluid pressure on said inlet and outlet sides of said valve means;

said pilot operated valve member including a valve body having a cavity therein, said cavity having a first port at one end generally concentric with and axially spaced from a second port at the other end thereof, an axially movable control poppet in said cavity extending between said first and second ports and having a first end for lapped sealing engagement with said first port and a second end for lapped sealing engagement with said second port, said control poppet being axially positionable in said cavity in a nearly zero lapped position relative to said first and second ports and being biased toward said second port by said fluid pressure on said inlet side of said valve member;

said pilot operated valve member including means for biasing said control poppet in a direction opposite the direction of biasing of said fluid pressure on said inlet side of said valve means, said cavity also having a third port in communication with said actuator means, said biasing means being adjustable to adjust said pressure on said outlet side of said valve means by controlling communication of said actuator means with said fluid passageway on said inlet side of said valve means during operation of said systems said biasing means limiting said fluid pressure on said outlet side of said valve means to a predetermined set operating pressure;

said pilot operated valve member including means for limiting the rate of increase in fluid pressure toward said predetermined operating pressure on said outlet side of said valve member during start-up of said system;

said poppet accommodating flow of said fluid from said first port, through said cavity, and through said second and third ports in said nearly zero lapped position thereof.

7. The control valve of claim 6 wherein said poppet is an elongated cylindrical valve member generally concentric with said first and second ports and having a uniform diameter substantially along its entire length closely approximating the diameter of said first and second ports, said poppet having opposing ends adapted for sliding insertion into said first and second ports, said opposing ends having generally conically tapered surfaces for controlling the gain characteristics of said pilot operated valve member.

8. The control valve of claim 6 including an inlet pressure sensing line extending from said pilot operated valve member in communication with said fluid passageway on said inlet side of said valve means and including an outlet pressure sensing line extending from said pilot operated valve member in communication with said fluid passageway on said outlet side of said valve means, said fluid pressure on said inlet side of said valve means being supplied to said pilot operated valve member through said inlet pressure sensing line and said fluid pressure on said outlet side of said valve means being supplied to said pilot operated valve member through said outlet pressure sensing line.

9. The control valve of claim 6 wherein said pilot operated valve member includes a diaphragm assembly axially spaced from said poppet, said diaphragm assembly including at least one chamber in communication with said fluid pressure on said outlet side of said valve means, said chamber being arranged such that said fluid pressure on said outlet side of said valve means biases said poppet toward said closed position, said diaphragm assembly and chamber comprising means for limiting said fluid pressure on said outlet side of said valve means to said operating pressure during operation of said system.

10. The control valve of claim 9 wherein said biasing means includes a spring assembly in said chamber acting on said diaphragm assembly to bias said poppet toward said first port, said spring assembly being adjustable externally of said pilot operated valve member to select said predetermined set operating pressure of said system.

11. The control valve of claim 10 wherein said diaphragm assembly includes a second chamber in restricted communication with said fluid pressure on said inlet side of said valve means through a separate valve member, said second chamber being arranged such that said fluid pressure passing through said separate valve member biases said poppet toward said second port, said diaphragm assembly and second chamber comprising means for limiting the rate of increase in fluid pressure toward said operating pressure on said outlet side of said valve means during start-up of said system.

12. The control valve of claim 11 wherein said separate valve member is a ramp control valve having a restricted orifice limiting the introduction of said fluid pressure into said second chamber during start-up of said system.

13. The control valve of claim 12 wherein said diaphragm assembly includes a third chamber in selective communication with said fluid pressure on said inlet side of said valve means through a separate valve member, said chamber being arranged such that said fluid pressure passing through said separate valve member biases said poppet toward said first port, said diaphragm assembly and chamber comprising means for adjusting said pressure on said outlet side of said valve means to change the speed of said system during operation thereof.

14. The control valve of claim 13 wherein said separate valve member is a flapper valve selectively supplying and venting said fluid pressure to and from said third chamber during operation of said system.

15. A control valve for supplying a fluid under pressure to a fluid operated system, comprising:
a valve body including a fluid passageway having an inlet communicating with a source of said fluid and an outlet communicating with said system;
valve means disposed in said fluid passageway between said inlet and outlet, said valve means being movable between open and closed positions, said valve means being in a closed position prior to start-up of said system;
an inlet pressure sensing line communicating with said fluid passageway on said inlet side of said valve means and an outlet pressure sensing line communicating with said fluid passageway on said outlet side of said valve means;
a modular pilot operated valve member in communication with said inlet and outlet pressure sensing lines and responsive to fluid pressure on said inlet and outlet sides of said valve means;
an actuator adapted for communication with said fluid passageway on said inlet side of said valve means through said modular pilot operated valve member, said actuator being operable to move said valve means between said closed position and said open position, said actuator moving said valve means dependent upon said fluid pressure on said inlet and outlet sides of said valve means;
control means in said inlet pressure sensing line including an on-off valve and a pressure regulator valve, said on-off valve being operable to selectively supply fluid pressure on said inlet side of said valve means fo said modular pilot operated valve member dependent upon the position of an on-off solenoid, said control means including means for venting said inlet pressure sensing line to ambient when said solenoid is in said off position;
said modular pilot operated valve member including means for limiting the rate of increase in fluid pressure toward an operating pressure on said outlet side of said valve means during start-up of said system, means for adjusting said pressure on said outlet side of said valve means to change the speed of said system during operation thereof, and means for limiting said fluid pressure on said outlet side of said valve means to said operating pressure during operation of said system;
said modular pilot operated valve member including an axially movable poppet, said fluid pressure on said inlet side of said valve means biasing said poppet from a closed position to an open position, said modular pilot operated valve memeber including a valve body having a cavity with a first port at one end thereof and a second port at the other end thereof, said first port being axially spaced from said second port, and including means for selectively setting the spacing between said first and second ports.

16. The control valve of claim 15 wherein said valve means is a butterfly valve disposed in said valve body and said actuator means is a spring biased piston operably joined to said butterfly valve.

17. The control valve of claim 15 wherein said poppet extends between said first and second ports and is movable in said cavity relative to said first and second ports, said means for selectively setting the spacing between said first and second ports including a shim adapted for insertion between first and second body portions.

18. The control valve of claim 17 wherein said modular pilot operated valve member includes a chamber defined in part by a diaphragm assembly adapted to bias said poppet in the same direction as said fluid pressure on said inlet side of said valve means, and including ramp control valve means integral with said body for supplying a fluid pressure signal to said chamber, said diaphragm assembly and chamber comprising said means for limiting the rate of increase in fluid pressure toward said operating pressure on said inlet side of said valve means during start-up of said system.

19. A control valve for supplying a fluid under pressure to a fluid operated system, comprising:
   a fluid passageway including an inlet communicating with a source of said fluid and an outlet communicating with said system;
   valve means disposed in said fluid passageway between said inlet and outlet, said valve means being movable between open and closed postions, said valve means being in a closed position prior to start-up of said system;
   a pilot operated valve member responsive to fluid pressure on said inlet and outlet sides of said valve means; and
   actuator means adapted for communication with said fluid passageway on said inlet side of said valve means through said pilot operated valve member, said actuator means being operable to move said valve means between said closed position and said open position, said actuator means moving said valve means dependent upon said fluid pressure on said inlet and outlet sides of said valve means;
   said pilot operated valve member including means for limiting the rate of increase in fluid pressure toward an operating pressure on said outlet side of said valve means during start-up of said system, means for adjusting said pressure on said outlet side of said valve means to change the speed of said system during operation thereof, and means for limiting said fluid pressure on said outlet side of said valve means to said operating pressure during operation of said system;
   said pilot operated valve member including an axially movable poppet, said fluid pressure on said inlet side of said valve means biasing said poppet from a closed position to an open position, said pilot operated valve member also including a diaphragm assembly axially spaced from said poppet;
   said diaphragm assembly including at least one chamber in restricted communication with said fluid pressure on said inlet side of said valve means through a separate valve member, said chamber being arranged such that said fluid pressure passing through said separate valve member biases said poppet toward said open position, said diaphragm assembly and chamber comprising said rate limiting means.

20. A control valve for supplying a fluid under pressure to a fluid operated system, comprising:
   a fluid passageway including an inlet communicating with a source of said fluid and an outlet communicating with said system;
   valve means disposed in said fluid passageway between said inlet and outlet, said valve means being movable between open and closed positions, said valve means being in a closed position prior to start-up of said system;
   a pilot operated valve member responsive to fluid pressure on said inlet and outlet sides of said valve means; and
   actuator means adapted for communication with said fluid passageway on said inlet side of said valve means through said pilot operated valve member, said actuator meams being operable to move said valve means between said closed position and said open position, said actuator means moving said valve means dependent upon said fluid pressure on said inlet and outlet sides of said valve means;
   said pilot operated valve member including means for limiting the rate of increase in fluid pressure toward an operating pressure on said outlet side of said valve means during start-up of said system, means for adjusting said pressure on said outlet side of said valve means to change the speed of said system during operation thereof, and means for limiting said fluid pressure on said outlet side of said valve means to said operating pressure during operation of said system;
   said pilot operated valve member including an axially movable poppet, said fluid pressure on said inlet side of said valve means biasing said poppet from a closed position to an open position, said pilot operated valve member including a diaphragm assembly axially spaced from said poppet;
   said diaphragm assembly including at least one chamber in selective communication with said fluid pressure on said inlet side of said valve means through a separate valve member, said chamber being arranged such that said fluid pressure passing through said separate valve member biases said poppet toward said closed position, said diaphragm assembly and chamber comprising said pressure adjusting means.

* * * * *